Aug. 2, 1960    G. R. BETHUNE, JR    2,947,558
KNOT-TYING APPARATUS

Filed Feb. 12, 1957    2 Sheets-Sheet 1

INVENTOR.
GEORGE R. BETHUNE, JR.
BY
*R. L. Miller*
ATTORNEY

Aug. 2, 1960　　　G. R. BETHUNE, JR　　　2,947,558
KNOT-TYING APPARATUS

Filed Feb. 12, 1957　　　　　　　　　　　　　　2 Sheets-Sheet 2

*INVENTOR.*
GEORGE R. BETHUNE, JR.

BY

*R. L. Miller*
ATTORNEY an# United States Patent Office 2,947,558
Patented Aug. 2, 1960

2,947,558
KNOT-TYING APPARATUS

George R. Bethune, Jr., Cartersville, Ga., assignor to The Goodyear Tire & Rubber Company, Akron, Ohio, a corporation of Ohio Filed Feb. 12, 1957, Ser. No. 639,713
19 Claims. (Cl. 289—2)

This invention relates to a device for tying knots, and particularly to a device for tying a knot variously referred to as the blood knot, barrel knot, fisherman's knot, etc. (hereinafter to be referred to as a barrel knot).

The use of the barrel knot for tying two cords or strands together is well known in the textile trade as well as in other activities where the rapid, reliable connection of two strands is necessary. The barrel knot offers particular advantages where two cords are to be connected in the course of weaving fabric for the manufacture of tires in that this type of knot avoids the chance of one cord sawing against the other during the manufacture and use of tires resulting in breakage or severe weakening of the cords. Furthermore, the barrel knot possesses a very high tensile strength, in the experience of the inventor the highest of many knots which might be used to join two cords, and therefore avoids the possibility of breakage of the joined cords at the point of the knot. In addition, this particular knot is well suited for connecting cords made of nylon or other materials of similar slick or slippery character in such a way that the cords will not slip and the knot itself does not present undesirably large bumps or knobs in a fabric to be utilized in tire manufacture or similar uses. However, the old methods and devices for tying the barrel knot give rise to difficulties in that considerable manual dexterity is required in their practice and assurance of uniformity of a series of knots requires close inspection and monitoring. The present invention largely does away with such problems and at the same time provides a simple, rapid method for tying the knot. This is accomplished by providing a device which itself mechanically performs the most intricate manipulations during the tying of the knot and maintains constant certain operational factors which might vary with manual operation.

A major object of this invention is to provide a device for tying the barrel knot with a minimum of manual operation.

A further object of this invention is to provide a device for tying the barrel knot which requires a minimum of skill and manual dexterity in its operation.

A still further object of this invention is to provide means for tying the barrel knot rapidly and uniformly.

These and other objects of the invention will become apparent from the following description and drawings in which.

Figure 1:
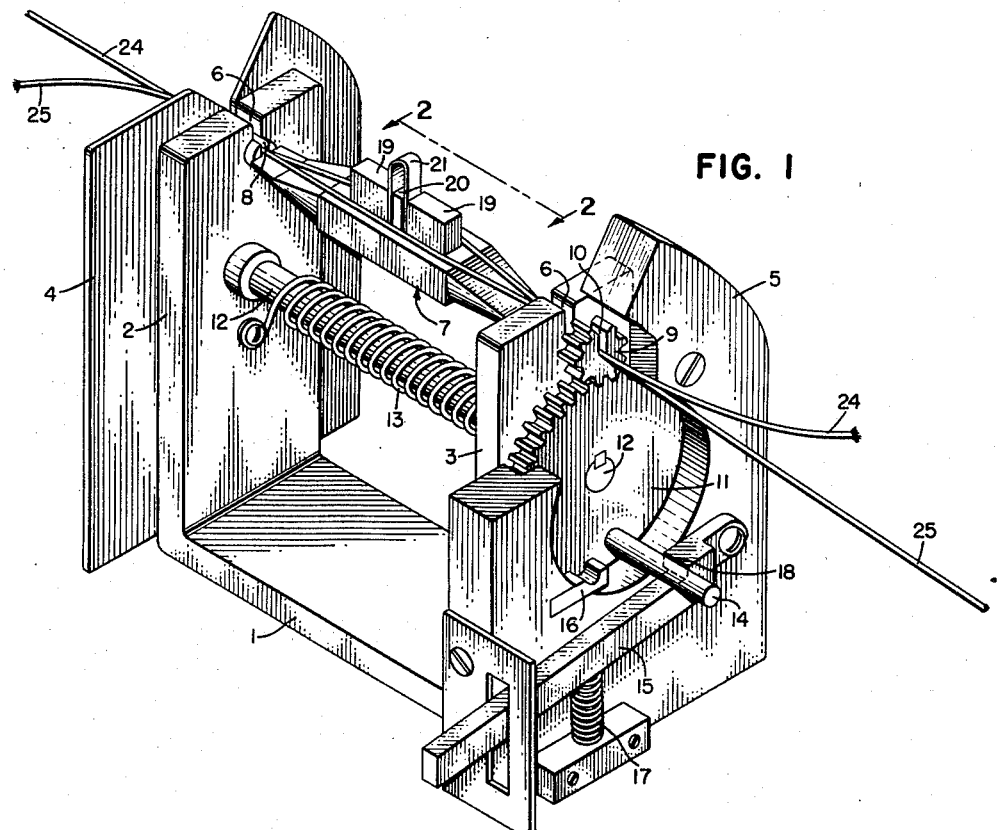
Fig. 1 is an isometric view of the device with portions thereof shown in section.

Referring to Fig. 1, the knot-tying device has a base portion 1 and upright support members 2 and 3. The support members 2 and 3 may be integral with the base 1 as shown in Fig. 1 or may be removably attached by any suitable means for simplification of fabrication or replacement. To support members 2 and 3 are attached cover plates 4 and 5 which serve as housings for certain of the parts of the device and as mounting surfaces for certain others. The cover plates 4 and 5 are conveniently made separable from the support members 2 and 3 to facilitate removal for lubrication and maintenance of moving parts. However, it is obvious that they may be fabricated as integral parts of the support members if it be desired. Both the support members 2 and 3 and the cover plates 4 and 5 have cord-positioning grooves 6 cut in their upper portions. The grooves are cut substantially along and of sufficient depth to reach the axis of rotation of the cord-twisting element 7 which is rotatably mounted between the support members 2 and 3. The cord-twisting element 7 has similar grooves 8 cut in its bearing ends so as to align with the cord-positioning grooves 6 when the device is in its wound or unwound state as will later be described. A gear 9 is attached to one end of the cord-twisting element 7, shown in Fig. 1 as the right-hand end, so as to engage the large drive gear 11. The gear 9 has a cord-positioning groove 10 cut at a point on its circumference so that the groove is in line with and substantially matches the similar cord-positioning grooves 6 and 8 previously mentioned.

The drive gear 11 is pinned to shaft 12 which has suitable bearings at its contact points with the support members 2 and 3 so that it is free to rotate about its longitudinal axis. Attached at one end to and wound about shaft 12 is a spring power element 13 which is anchored to support member 2 at its other end.

The drive mechanism which rotates the cord-twisting element 7 consists essentially of the power spring element 13, the shaft 12, the drive gear 11 and the driven gear 9. However, there is associated with the drive mechanism a control mechanism comprising the latch pin 14, the latch bar 15, the latch stop 16 and spring 17 which permits the automatic rotation of the cord-twisting element 7 a preset whole number of revolutions in a manner which will be subsequently explained.

As will be seen in Fig. 1, an assembly of elements is arrayed on the raised center portion of the cord-twisting member 7 and substantially centrally thereof. This assembly, which functions in the forming and drawing of the barrel knot, comprises guide members 19, a cord-separating element 20, cord-holding means 21, and a cord-severing means 22. While the function and co-action of these elements may be gathered to some degree from the terminology used, the invention and the combined action of its elements may be clearly understood from a description of the stages and steps in tying a barrel knot through the use of this device. For this purpose it will be assumed that two cords of the same size and composition are to be joined during the manufacture of threads for weaving tire fabric. It is clear, however, that the device is easily adaptable to other operations. In addition, although the term "cord" is used in this description, it should be understood that no limitation is to be implied to restrict the composition or configuration of the strands or filaments to be connected.

In tying a barrel knot with the invention, the device is initially cocked by moving the latch pin 14 in a clockwise direction from its normally uncocked position (not shown) against the latch stop 16 to the position shown in Fig. 1. At this point the latch bar 15 engages the latch pin 14 at step 18 formed in its upper surface to lock the gear 11 against rotation by preventing counter-clockwise movement of the latch pin 14. Spring 17 urges the latch bar 15 upwardly against the pin 14 to retain the pin 14 in the locked position until released. As is apparent, the aforementioned movement of the latch pin 14 rotates clockwise the drive gear 11 and shaft 12 and simultaneously "winds" the power spring 13. At the same time, the drive gear 11 rotates gear 9 to turn the cord-twisting element 7. The ratio of the drive gear 11 to the driven gear 9 and the location of the latch pin 14, latch stop 16 and step 18 in the latch bar 15 are selected so as to provide the same number of turns of the cord-twisting element 7 as desired in the knot. For simplicity of structure and operation this number is always an integral number of whole revolutions of cord-twisting element 7 but the apparatus could be constructed for fractional turns if desired.

It should also be noted that the choice of the number of turns in the knot is made to satisfy two basic requirements, i.e. the knot must contain a sufficient number of turns so that it has the tensile strength required for the particular application, in the present illustrative case a tire fabric cord, but should not contain more turns than necessary since this would result in unnecessarily large bumps which might be undesirable in the end use.

Next, as shown in Fig. 1, the two cards 24 and 25 to be joined together are brought from opposite sides of the device, passed through the cord-positioning grooves 6, 8 and 10 on their respective sides, passed along opposite sides of the guide members 19 over the surface of the cord-twisting element 7, and out through the cord-positioning grooves at the exit ends of the cord-twisting element 7. Since groove 10 is cut only in drive gear 9, the cords will pass therethrough only on one end of the apparatus.

Figure 7:
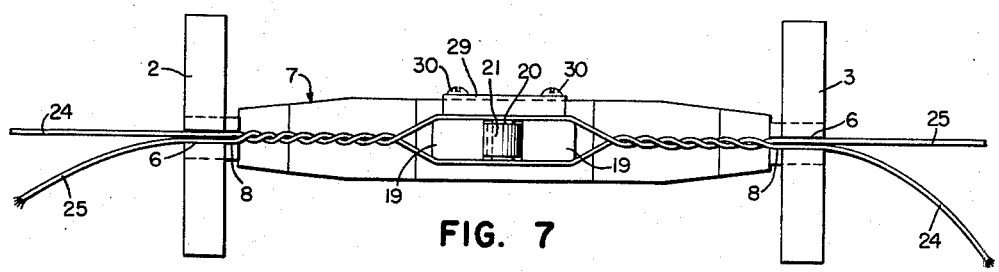
Figs. 7, 8 and 9 illustrate successive steps or stages in the tying of the knot.

With the cords placed as described above and held at their ends by the operator of the device, the latch bar 15 is depressed, permitting movement of the latch pin 14 in a counterclockwise direction due to the force of the power spring 13 acting through the drive mechanism, previously described in the cocking operation, which rotates the cord-twisting element 7 through the preset number of revolutions, thus twisting the cords together as in Fig. 7.

Figure 9:
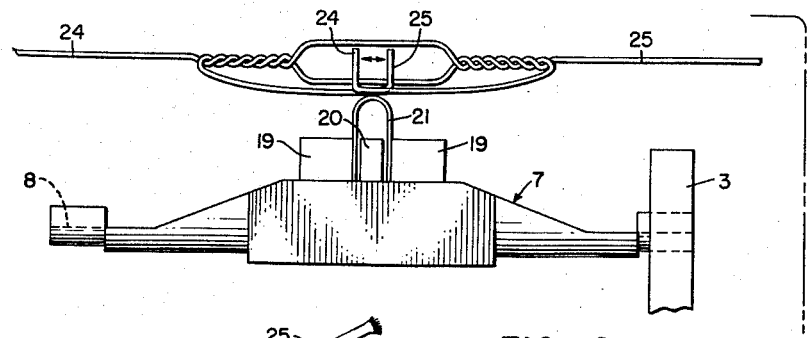

It can be clearly seen in Figs. 1 and 9, that, since the central portion of the cord-twisting member 7 is raised, the twisting of the cords will tend to pull the cord loop around the guide members 19 toward the axis of rotation of the cord-twisting member 7 and, hence, prevent the loop from slipping up and off the guide members prematurely. While it is possible to utilize a cord-twisting member having a planar upper surface, experience has shown that it is preferable that a portion of the surface be raised substantially with respect to the axis of rotation of the cord-twisting member in order to insure that the cord-loop will not prematurely pull up and off the cord-restraining assembly mounted on said raised portion. Furthermore, it is apparent that mechanical means of various sorts could be mounted in the cord-positioning grooves 6 so as to hold the free card ends rather than require the operator to hold the cords. This might be particularly desirable in tying cords of certain types or compositions of material. However, in the present illustrative case of tying textile cords, it is preferable and more expedient that the operator perform this function since some manual movement of portions of the cords is required later, as will be seen from the description of subsequent steps in tying the knot.

Figure 2:
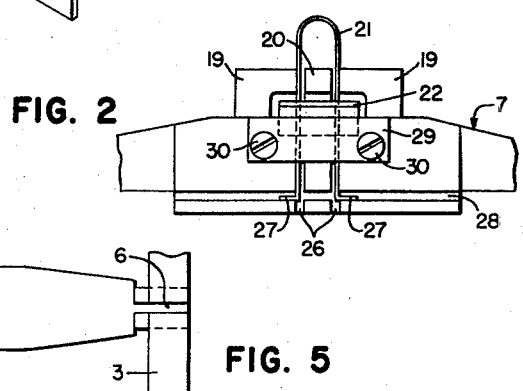
Fig. 2 is a view of a portion of the device along the line 2—2 shown in Fig. 1.
Figure 8:
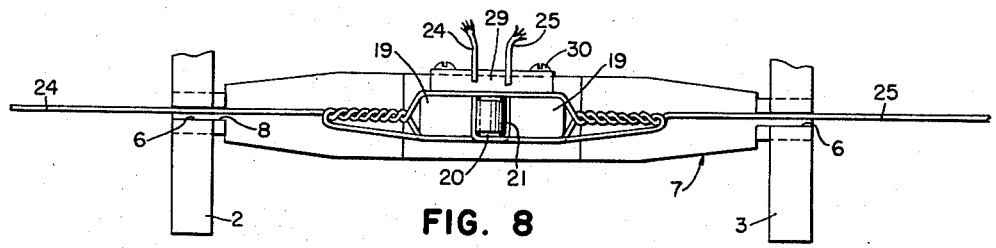

Having mechanically twisted the cords together the desired number of turns, usually at least three, and in the case of thin, relatively slick materials such as nylon, preferably five turns, the cords are then moved to the position shown in Fig. 8. That is, the loose ends of cords 24 and 25 are successively drawn out of the cord-positioning grooves 6, 8 and 10 by the operator, pulled inward toward the center of the cord-twisting element 7, passed around the far side of the cord-separating element 20 and the cord-holding means 21 and pulled down between guide means 19 and the cord-holding means 21 which grasps and holds them. The cord-separating element 20 may take on a variety of forms but need for the present use be only an upstanding pin as shown in Figs. 1 and 2. Likewise, the cord-holding means may be of different forms for different purposes, the preferred form being the upstanding spring element shown in Figs. 1, 2 and 9.

This particular form of a cord-holding element comprises an inverted U-shaped spring element formed of flat strip spring steel, the legs thereof being urged against the guides 19. As can be seen in Fig. 2, the cord-holding element is positioned with its vertical legs in grooves 26 cut in the cord-twisting element 7 and is held from vertical movement by the small lateral feet 27 formed at the end of the vertical legs and resting in the slot 28 cut in the cord-twisting means 7. The cord-holding element is restrained from horizontal movement in a direction perpendicular to the axis of rotation of the cord-twisting means 7 by the pressure plate 29 which is held in position by screws 30. The cord-holding element may easily be removed for maintenance or replacement by removing pressure plate 29 and cord-severing means 22 and sliding the cord-holding element horizontally out of the grooves cut in the cord-twisting element 7 previously described.

Figure 5:
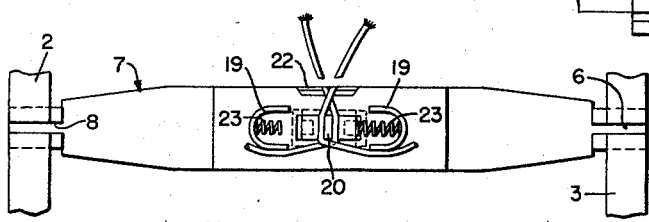
Fig. 5 is a top plan view of a portion of the device showing certain further modifications thereof.
Figure 6:
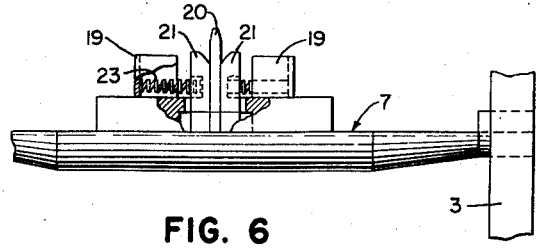
Fig. 6 is a partial frontal section of the device shown in Fig. 5.
Figure 3:
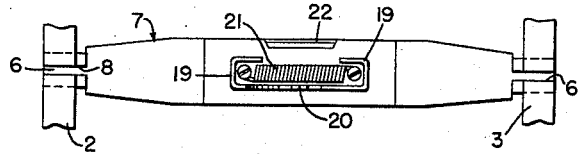
Fig. 3 is a top plan view of a portion of the device showing certain modifications thereof.
Figure 4:
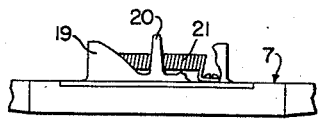
Fig. 4 is a partial frontal section of a segment of the device shown in Fig. 3.

In the embodiment shown in Figs. 5 and 6, the cord-holding means comprises a pair of upstanding pressure elements slidably mounted on the cord-twisting member which are pressed against the cord-separating element 20 by small springs 23 aligned horizontally along the cord-twisting means 7. In addition, the cord-separating element 20 is slidably mounted in a manner which will permit slight horizontal movement tending to equalize the pressure against the cords when they are drawn down between the cord-holding means and the cord-separating element. This permits simultaneous release of the cords when the knot is completed, as will later appear. A cord-holding element such as is shown in Figs. 3 and 4 may also be used advantageously in certain types of operations. The element there shown is a compressed horizontally disposed helical spring. In this arrangement the cord-separating element 20 is displaced from its position in Figs. 1 and 6 and fixed at a point in front of the holding means. However, the simpler form of the cord-holding means shown in Fig. 1 is preferred over those shown in Figs. 3 and 5, particularly where the material of the cords to be tied is easily frayed, since the spring elements of the embodiments shown in Figs. 3 and 5 tend to become fouled with lint and short segments of the cord filaments and the maintenance of equal pressure on each cord, while it can be accomplished, presents a greater problem.

After the cords are securely grasped by the cord-holding means 21, the excess cord length is then trimmed off. Any number of cutting means or methods may be used but a simple and preferred form of the cord-severing means 22 is shown in Fig. 2 as a razor edge held in place by pressure plate 29 and positioned adjacent the center point of the assembly mounted on the cord-twisting means and parallel to the axis of rotation of cord-twisting element 7. The razor edge is mounted sufficiently below the cord-holding means 21 so that the cords will have entered the holding means before they come into contact with and are trimmed by the cord-severing means 22. This form and location of the cord-severing means permits the placement and cutting of the cords in one continuous movement, thus avoiding an additional operation. In the embodiments shown in Figs. 3 and 5, the cord-severing means is shown as a razor edge placed in substantially the same position but with the razor face horizontally disposed.

It should be borne in mind that the cutting edge of the severing means 22 is set sufficiently low with respect to the cord-holding means 21 so that the cords will have been completely engaged by the holding means before they come into contact with the cutting edge of the severing means 22, thus insuring that the cords are firmly held in position and that, as will appear later, equal transverse tension on the cords will have been established before the operator in cutting the cords by pressure against the edge of severing means 22 will have lost control of the distal cord ends.

Figure 10:
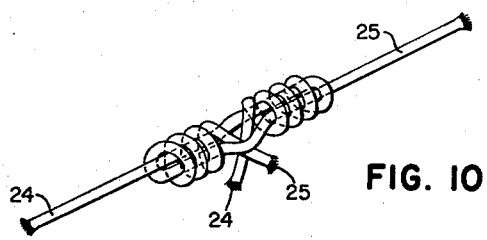
Fig. 10 is a slightly expanded view of the completed knot.

To complete the knot, the operator then grasps the medial cord portions extending to each side of the device as shown in Fig. 8 and pulls upwardly and outwardly. This movement causes the cord loop formed about the guide members 19 to slip over the short cord ends being held by the cord-holding means 21 as appears in Fig. 9. Continued pulling of the cords draws the loop tight about the cord ends and at the same time literally turns the knot inside out as the twisted cord segments roll back upon themselves, resulting in a knot as shown in Fig. 10. The illustration of the knot is made slightly expanded to facilitate tracing of the cords. As previously pointed out, the cord-holding means 21 and guide means 19 are constructed in such a way that the pressure on each of the cord-ends, indicated by force arrows in Fig. 9, is substantially the same so that equal tension is placed on the two cord ends as the loop is drawn tight about the cords. Hence, as the loop is pulled up from the device the cord ends are reluctantly but simultaneously released by the cord-holding means 21 and the consequent equalized tension on the cords results in a very compact and highly reliable knot. In the embodiment shown in Figs. 5 and 6, the cord-separating element 20 is, as previously mentioned, movable in a transverse direction in order to assure equal transverse tension on the cords. In the embodiment shown in Figs. 3 and 4, the compressed horizontal spring acting as a cord-holding element, tends by its inherent nature to adjust to provide equal cord tension.

While certain representative embodiments and details have been shown for the purpose of illustrating the invention, it will be apparent to those skilled in this art that various changes and modifications may be made therein without departing from the spirit or scope of the invention.

I claim:

1. An apparatus for tying two cord ends into a knot comprising a base, spaced-apart upstanding members secured to said base, a cord-twisting means extending between said upstanding members and rotatably journaled at each end thereof to one of said members, means to rotate said cord-twisting means a plurality of turns, and cord-holding means mounted on said twisting means to releasably hold said cords in the course of tying the knot.

2. An apparatus as claimed in claim 1 including cord-severing means, mounted on said cord twisting means adjacent said cord holding means and adapted to trim the cord ends.

3. An apparatus as claimed in claim 1, in which said cord-twisting means has the intermediate portion of its surface in raised relationship with respect to the axis of rotation thereof on which raised portion said cord-holding means is mounted.

4. An apparatus as claimed in claim 1 including guide means mounted on said cord-twisting means and cooperating with said cord-holding means to releasably hold and position said cords in the course of tying the knot.

5. An apparatus as claimed in claim 1 in which said cord-holding means comprises opposed upstanding clamp-like elements having their adjacent faces substantially parallel to each other.

6. An apparatus as claimed in claim 1 in which said cord-holding means comprises a horizontally disposed compressed helical spring element lying substantially parallel to the rotational axis of said cord-twisting means.

7. An apparatus as claimed in claim 1 wherein said means to rotate said cord-twisting member is so constructed and arranged to rotate said cord-twisting means a predetermined whole number of revolutions.

8. An apparatus for tying two cord ends into a knot comprising a base, spaced-apart upstanding members secured to said base, a cord-twisting means extending between said upstanding members and rotatably journaled at each end thereof to one of said members, means to rotate said cord-twisting means a plurality of revolutions to twist the cords together, guide means mounted on said cord-twisting means to maintain the cords in spaced-apart relationship when the cords are passed along opposite sides thereof, cord-holding means mounted on said cord-twisting means intermediate said guide means, said cord-holding means and guide means cooperating to releasably hold and position the cord ends in the course of tying the knot.

9. An apparatus as claimed in claim 8, in which said cord-twisting means has the intermediate portion of its surface in raised relationship with respect to the axis of rotation thereof on which raised portion said guide means and cord-holding means are mounted.

10. An apparatus as claimed in claim 8 in which said cord-holding means comprises an upright spring element substantially of an inverted U configuration.

11. An apparatus as claimed in claim 8 in which said guide means comprises a pair of opposed upstanding surfaces whereby the cords pass on opposite sides thereof when tying the knot.

12. An apparatus for tying two cord ends into a knot comprising a base, spaced-apart upstanding members secured to said base, a cord-twisting means extending between said upstanding members and rotatably journaled at each end thereof to one of said members, guide means mounted on said cord-twisting means to maintain the cords in spaced-apart relationship when the cords are passed along opposite sides of said guide means, means to rotate said cord-twisting means a plurality of revolutions to twist the cords together, cord-holding means mounted on said cord-twisting means intermediate said guide means, and a cord-separating element on said cord-twisting means intermediate said guide means, said cord-holding means and cord-separating element cooperating to releasably hold and position the cord ends in the course of tying the knot.

13. An apparatus for joining two cord ends in a knot comprising a base, a pair of spaced-apart upstanding members secured to said base, a cord-twisting means rotatably supported between and journaled at each end thereof in one of said upstanding members with the intermediate portion thereof in raised relationship with respect to the axis of rotation thereof, means to rotate said cord-twisting means a predetermined number of revolutions, cord-positioning means on each of said upstanding members, guide means mounted on the raised portion of said cord-twisting means and including a pair of upright spaced apart elements whereby the cords pass on opposite sides thereof in the course of tying the knot, cord-holding means mounted on said cord-twisting means intermediate said guide means, said cord-holding means comprising an upright spring element substantially of an inverted U configuration, said cord-holding means and guide means cooperating to releasably hold and position said cords in the course of tying the knit, and cord-severing means adjacent said cord-holding means.

14. An apparatus as claimed in claim 13 wherein said means to rotate said cord-twisting means comprises a spring-powered drive gear engaging a driven gear connected to said cord-twisting means, the number of revolutions of said driven gear and said cord-twisting means being limited by latch and stop means on said drive gear and the gear ratio of said drive gear to said driven gear.

15. An apparatus as claimed in claim 14 wherein said means to rotate said cord-twisting means is so constructed and arranged to rotate said cord-twisting means at least three whole revolutions.

16. An apparatus for joining two cord ends in a knot comprising a base; a pair of spaced-apart upstanding members secured to said base; a cord-twisting means rotatably supported between and journaled at each end thereof in one of said upstanding members with the intermediate portion thereof in raised relationship with respect to its axis of rotation; cord-positioning means on each of said upstanding members, said positioning means comprising a groove cut in the upper portion of each of said upstanding members substantially parallel to and of sufficient depth to reach the rotational axis of said cord-twisting means; guide means mounted on the raised portion of said cord-twisting means and including a pair of opposed surfaces whereby the cords pass on opposite sides thereof in the course of tying the knot; means to rotate said cord-twisting means a predetermined whole number of revolutions; cord-holding means mounted on said cord-twisting means intermediate said guide means, said cord-holding means comprising opposed upstanding clamp-like elements; a cord-separating element on said cord-twisting means intermediate the opposed faces of said cord-holding means, said cord-holding means and cord-separating element being slidably mounted on said cord-twisting means to permit lateral movement thereof; and cord-severing means adjacent said cord-holding means.

17. An apparatus for tying two cord ends into a knot comprising a base; two spaced-apart upstanding members secured to said base; a cord-twisting means extending between said upstanding members and rotatably journaled at each end thereof to one of said members and having the central portion thereof raised with respect to its axis of rotation; means to rotate said cord-twisting means a predetermined whole number of revolutions to twist the cords together; cord-positioning means on each of said upstanding members, said positioning means comprising a groove cut in the upper portion of each of said upstanding members substantially parallel to and of sufficient depth to reach the rotational axis of said cord-twisting means, guide means mounted on said cord-twisting means substantially centrally along the length thereof, said guide means comprising a pair of spaced-apart opposed upstanding elements whereby the cords pass on opposite sides thereof when tying the knot, cord-holding means mounted on said cord-twisting means intermediate said guide means, said cord-holding means comprising an upright spring element substantially of an inverted U configuration, said cord-holding means and guide means cooperating in pressing contact to releasably hold and position the cords in the course of tying the knot; and cord-severing means adjacent said cord-holding means, said cord-severing means comprising a horizontally disposed cutting edge lying substantially parallel to the rotational axis of said cord-twisting means and substantially lower than the line of convergency of said cord-holding means and said guide means.

18. An apparatus for tying two cord ends into a knot comprising a base; two spaced-apart upstanding members secured to said base; a cord-twisting means extending between said upstanding members and rotatably journaled at each end thereof to one of said members and having the central portion thereof raised with respect to its axis of rotation, cord-positioning means on each of said upstanding members, said positioning means comprising a groove cut in the upper portion of each of said upstanding members substantially parallel to and of sufficient depth to reach the rotational axis of said cord-twisting means; guide means mounted on said cord-twisting means substantially centrally along the length thereof, said guide means comprising a pair of opposed upstanding surfaces whereby the cords pass on opposite sides thereof in the course of tying the knot; means to rotate said cord-twisting means a predetermined whole number of revolutions to twist the cords together; cord-holding means mounted on said cord-twisting means intermediate said guide means, said cord-holding means comprising a horizontally disposed compressed helical spring element lying substantially parallel to the rotational axis of said cord-twisting means; a cord-separating element fixed at a point adjacent to and substantially centrally of said cord-holding means; and cord-severing means adjacent said cord-holding means, said cord-severing means comprising a horizontally disposed cutting edge lying substantially parallel to the rotational axis of said cord-twisting means and substantially radially inward with respect to the axis of rotation of said cord-twisting means of the radially outer portion of said cord-holding means.

19. An apparatus for tying two cord ends into a knot comprising a base; two spaced-apart upstanding members secured to said base, a cord-twisting means extending between said upstanding members and rotatably journaled at each end thereof to one of said members and having the central portion thereof raised with respect to its axis of rotation; cord-positioning means on each of said upstanding members, said positioning means comprising a groove cut in the upper portion of each of said upstanding members substantially parallel to and of sufficient depth to reach the rotational axis of said cord-twisting means; guide means mounted on said cord-twisting means substantially centrally along the length thereof, said guide means comprising a pair of spaced-apart opposed upstanding surfaces whereby the cords pass on opposite sides thereof in the course of tying the knot; means to rotate said cord-twisting means a predetermined whole number of revolutions to twist the cords together; cord-holding means mounted on said cord-twisting means intermediate said guide means, said cord-holding means comprising opposed upstanding clamp-like elements; a cord-separating element on said cord-twisting means intermediate and in pressing contact with the opposed faces of said cord-holding means, said cord-holding means and cord-separating element being slidably mounted on said cord-twisting means to permit lateral movement thereof; and cord-severing means adjacent said cord-holding means, said cord-severing means comprising a horizontally disposed cutting edge lying substantially parallel to the rotational axis of said cord-twisting means and substantially lower than the line of contact of the opposed faces of said cord-holding means with said cord-separating element.

References Cited in the file of this patent
UNITED STATES PATENTS

| | | |
|---|---|---|
| 2,518,687 | Harvey | Aug. 15, 1950 |
| 2,757,600 | Eby et al. | Aug. 7, 1956 |
| 2,781,213 | Tarbox | Feb. 12, 1957 |
| 2,807,487 | Tarbox et al. | Sept. 24, 1957 |